(12) United States Patent
Wu et al.

(10) Patent No.: US 9,813,594 B2
(45) Date of Patent: Nov. 7, 2017

(54) PHOTON-DRIVE FINGERPRINT IDENTIFICATION MODULE

(71) Applicant: Gingy Technology Inc., Hsinchu (TW)

(72) Inventors: Jen-Chieh Wu, Hsinchu (TW); Chun-Lang Hung, Taichung (TW)

(73) Assignee: Gingy Technology Inc., Hsinchu (TW)

( * ) Notice: Subject to any disclaimer, the term of this patent is extended or adjusted under 35 U.S.C. 154(b) by 322 days.

(21) Appl. No.: 14/700,104

(22) Filed: Apr. 29, 2015

(65) Prior Publication Data

US 2016/0219195 A1 Jul. 28, 2016

(30) Foreign Application Priority Data

Jan. 28, 2015 (TW) ............................. 104102836 A

(51) Int. Cl.
*G06K 9/74* (2006.01)
*H04N 5/225* (2006.01)
(Continued)

(52) U.S. Cl.
CPC ......... *H04N 5/2252* (2013.01); *G06K 9/0004* (2013.01); *G06K 9/00013* (2013.01);
(Continued)

(58) Field of Classification Search
CPC .............. G02B 5/3083; G02B 17/0804; G02B 27/0944; G02B 27/4277; G02B 5/045;
(Continued)

(56) References Cited

U.S. PATENT DOCUMENTS 5,920,384 A * 7/1999 Borza ................ G06K 9/00046
356/71
6,001,860 A 12/1999 Hamanaka
(Continued)

OTHER PUBLICATIONS

"Search Report of European Counterpart Application", dated May 31, 2016, p. 1-p. 11, in which the listed references were cited.
(Continued)

*Primary Examiner* — Michael P Stafira
(74) *Attorney, Agent, or Firm* — JCIPRNET

(57) ABSTRACT

A photon-drive fingerprint identification module configured to detect a fingerprint of a finger is provided, and the photon-drive fingerprint identification module includes at least a light emitting unit and a light detecting semiconductor array. The light emitting unit is configured to emit a detecting light to the finger, and the finger and the fingerprint reflect the detecting light and turn it into a signal light. The light detecting semiconductor array includes a plurality of light detecting semiconductor units arranged in an array, and the light detecting semiconductor units are configured to receive the signal light reflected by the finger and generate a plurality of electrical signals. Each of the light detecting semiconductor units sequentially includes an antireflection structure, a first type doped semiconductor layer and a second type doped semiconductor layer. The first type doped semiconductor layer is stacked between the antireflection structure and the second type doped semiconductor layer.

14 Claims, 3 Drawing Sheets

(51) Int. Cl.
  *G06K 9/00* (2006.01)
  *G06K 9/20* (2006.01)
(52) U.S. Cl.
  CPC ..... *G06K 9/00033* (2013.01); *G06K 9/00087* (2013.01); *G06K 9/209* (2013.01)
(58) Field of Classification Search
  CPC ...... G02B 5/10; G02B 5/1814; G02B 5/1861; G02B 5/1866; G02B 5/1876; G02B 5/1885; G02B 5/3016; G02B 6/0018; G02B 6/0038
  See application file for complete search history.

(56) References Cited

U.S. PATENT DOCUMENTS

| | | | | |
|---|---|---|---|---|
| 6,195,448 | B1* | 2/2001 | Schiller | G06K 9/00046 356/71 |
| 7,349,561 | B2 | 3/2008 | Hata | |
| 7,760,921 | B2 | 7/2010 | Sawano | |
| 2003/0090650 | A1 | 5/2003 | Fujieda | |
| 2004/0119968 | A1* | 6/2004 | Ma | G06K 9/00046 356/71 |
| 2007/0025601 | A1* | 2/2007 | Cheng | G06K 9/00046 382/124 |
| 2007/0030475 | A1* | 2/2007 | Rowe | A61B 5/117 356/71 |
| 2008/0028372 | A1 | 1/2008 | Garms et al. | |
| 2008/0123908 | A1* | 5/2008 | Waldman | G06K 9/00046 382/124 |
| 2010/0193893 | A1* | 8/2010 | Meinhardt | H01L 27/14634 257/461 |
| 2013/0119237 | A1 | 5/2013 | Raguin et al. | |

OTHER PUBLICATIONS

Fujieda I et al:"Fingerprint Input Based on Scattered-Light Detetion",Applied Optics, Optical Society of America, Washington, DC; US. vol. 36, No. 35, Dec. 10, 1997, pp. 9152-9156.
Seitz Peter: "Solid-state image sensing" In: "Computer Vision and Applications.", 2000, Academic Press., San Diego, CA, US 028506, XP055273697, p. 111-151.
J.A. Dobrowolski: "Opticfal Properties of Films and Coatings" In: Handbook of Optics, Sep. 1994, pp. 42.1-42.130.

* cited by examiner

PHOTON-DRIVE FINGERPRINT IDENTIFICATION MODULE

CROSS-REFERENCE TO RELATED APPLICATION

This application claims the priority benefit of Taiwan application serial no. 104102836, filed on Jan. 28, 2015. The entirety of the above-mentioned patent application is hereby incorporated by reference herein and made a part of this specification.

BACKGROUND

Technical Field

The invention relates to a fingerprint identification module, and particularly relates to a photon-drive fingerprint identification module.

Related Art

In conventional identity identification technology, a method for identifying a fingerprint is implemented as follows: a finger presses an ink and then presses a paper to form a fingerprint pattern, and then the fingerprint pattern is input to a computer through optical scanning for creating a file or comparison. The aforementioned method for identifying the fingerprint has a disadvantage of none real-time processing, which cannot satisfy the requirement on real-time identity identification in today's society. Therefore, electronic fingerprint detecting device becomes one of the mainstreams in development of today's technology.

In the existing electronic fingerprint detecting devices, when an electronic fingerprint detecting device, for example, a capacitive fingerprint detecting device, applies an integrated circuit to sense a touch operation of a finger in a detecting region, capacitances of the detecting region may have a difference, and a corresponding fingerprint signal is output according to the capacitance difference. However, the above capacitive fingerprint detecting device is required to accurately control capacitances of each point on the detecting region, so that a configuration density and configuration accuracy of electronic devices such as electrodes, etc. on the detecting region are enhanced, which accordingly enhances manufacturing difficulty and cost. On the other hand, in order to form a capacitor between positive and negative electrodes, the capacitive fingerprint detecting device is required to additionally increase a space between the positive electrode and the negative electrode, such that a volume and a thickness of the capacitive fingerprint detecting device are increased.

SUMMARY

The invention is directed to a photon-drive fingerprint identification module, which has a simple structure and high sensitivity.

An embodiment of the invention provides a photon-drive fingerprint identification module configured to detect a fingerprint of a finger, and the photon-drive fingerprint identification module includes at least a light emitting unit and a light detecting semiconductor array. The light emitting unit is configured to emit a detecting light to the finger, and the finger and the fingerprint reflect the detecting light and turn the detecting light into a signal light. The light detecting semiconductor array includes a plurality of light detecting semiconductor units arranged in an array, and the light detecting semiconductor units are configured to receive the signal light reflected by the finger and generate a plurality of electric signals. Each of the light detecting semiconductor units sequentially includes an antireflection structure, a first type doped semiconductor layer and a second type doped semiconductor layer from a side close to the finger. The first type doped semiconductor layer is stacked between the antireflection structure and the second type doped semiconductor layer.

In an embodiment of the invention, the photon-drive fingerprint identification module further includes a substrate. The light emitting unit and the light detecting semiconductor array are disposed on a surface of the substrate, and the light detecting semiconductor array is located between the finger and the substrate.

In an embodiment of the invention, the surface of the substrate includes a detecting region and at least one light emitting region, and the at least one light emitting region is located beside the detecting region. The light detecting semiconductor units are arranged in the detecting region, and the light emitting unit is disposed in the light emitting region.

In an embodiment of the invention, the at least one light emitting region is plurality of light emitting regions, the at least one light emitting unit is a plurality of light emitting units. The light emitting regions are located at a peripheral region of the detecting region.

In an embodiment of the invention, the detecting region has a rectangular profile, and each side length of the detecting region is greater than or equal to 4 millimeter (mm).

In an embodiment of the invention, the light emitting unit emits light along a direction perpendicular to the surface.

In an embodiment of the invention, the light emitting unit emits light along a direction oblique to the surface.

In an embodiment of the invention, the antireflection structure is an antireflection layer, and a detecting surface is located at a side of the antireflection layer facing away from the substrate.

In an embodiment of the invention, the antireflection structure of each of the light detecting semiconductor units is at least one optical microstructure.

In an embodiment of the invention, a shortest distance between the light emitting unit and the light detecting semiconductor units is smaller than or equal to 20 mm.

In an embodiment of the invention, the light detecting semiconductor array further includes a plurality of first electrodes and a second electrode. Each of the first electrodes is electrically connected to the first type doped semiconductor layer of one of the light detecting semiconductor units, the second electrode is electrically connected to the second type doped semiconductor layers, and the first electrodes are configured to transmit the electric signals.

In an embodiment of the invention, the light detecting semiconductor units are configured to detect a target light, where a wavelength of the target light is within a specific waveband, and the specific waveband includes a wavelength of the detecting light.

In an embodiment of the invention, the wavelength of the specific waveband is greater than or equal to 300 nanometer (nm) and is smaller than or equal to 3 micrometer (μm).

In an embodiment of the invention, the photon-drive fingerprint identification module further includes at least one processing unit. The processing unit is electrically connected to the light detecting semiconductor units, and converts the electric signals into at least one digital signal.

According to the above descriptions, in the photon-drive fingerprint identification module according to the embodiment of the invention, the light emitting unit is configured to emit the detecting light to irradiate the finger, and the light detecting semiconductor array is configured to receive the signal light formed by the detecting light after being reflected by the finger, so as to output the electric signals corresponding to the fingerprint. Since the photon-drive fingerprint identification module is composed of the light detecting semiconductor array, a whole volume of the photon-drive fingerprint identification module can be decreased by thinning the light detecting semiconductor array. On the other hand, since each of the light detecting semiconductor units of the light detecting semiconductor array includes the antireflection layer configured close to the finger, a light input amount of the light detecting semiconductor unit is enhanced through the antireflection layer, i.e. a receiving efficiency and sensitivity of the light detecting semiconductor array for the signal light are enhanced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
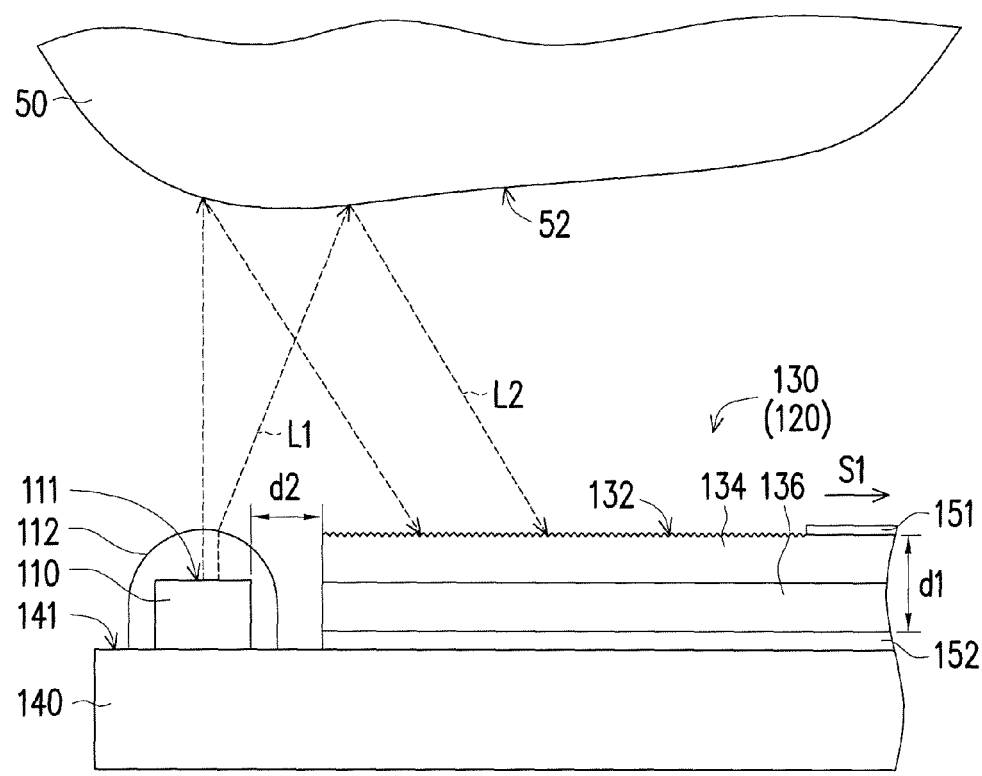
FIG. 1 is a partial cross-sectional view of a photon-drive fingerprint identification module according to a first embodiment of the invention.

FIG. 1 is a partial cross-sectional view of a photon-drive fingerprint identification module according to a first embodiment of the invention. Referring to FIG. 1, in the first embodiment of the invention, the photon-drive fingerprint identification module 100 configured to detect a fingerprint 52 of a finger 50 includes at least a light emitting unit 110 and a light detecting semiconductor array 120. The light emitting unit 110 is configured to emit a detecting light L1 to the finger 50, and the finger 50 and the fingerprint 52 reflect the detecting light L1 and turn the detecting light L1 into a signal light L2. The signal light L2 is not limited to a reflected light coming from a surface of the finger 50 shown in FIG. 1, but further includes the light reflected by inner tissues of the finger 50 after penetrating through the surface of the finger 50, and in FIG. 1, only one of the lights is schematically illustrated, which is not used for limiting the invention.

Referring to FIG. 1, in the present embodiment, the light detecting semiconductor array 120 includes a plurality of light detecting semiconductor units 130 arranged in an array. In order to clearly describe the configuration relationship of the above various components, one of the light detecting semiconductor units 130 and the light emitting unit 110 are illustrated in FIG. 1, though the invention is not limited thereto. The light detecting semiconductor units 130 are configured to receive the signal light L2 reflected by the finger 50 and generate electric signals S1. The light detecting semiconductor unit 130 sequentially includes an antireflection structure 132, a first type doped semiconductor layer 132 and a second type doped semiconductor layer 134 from a side close to the finger 50. The first type doped semiconductor layer 134 is stacked between the antireflection structure 132 and the second type doped semiconductor layer 136. Therefore, the light detecting semiconductor units 130 may detect a plurality of the signal lights L2 reflected by the finger 50, and the signal lights L2 may have different light energy characteristics according to different structures at different positions of the finger 50 and the fingerprint 52, such that the electric signals S1 output by the light detecting semiconductor units 130 also carry information of the finger 50 and the fingerprint 52. On the other hand, the antireflection structure 132 may assist the signal lights L2 to enter the light detecting semiconductor units 130, so that the light emitting unit 110 and the light detecting semiconductor array 120 of the present embodiment can provide a good fingerprint identification effect.

In the present embodiment, the first type doped semiconductor layer 134 of the light detecting semiconductor unit 130 is, for example, a semiconductor material doped with an n-type dopant, and the second type doped semiconductor layer 136 is, for example, a semiconductor material doped with a p-type dopant. The semiconductor material of the first type doped semiconductor layer 134 and the second type doped semiconductor layer 136 may include silicon, CdS, $CuInGaSe_2$ (GIGS), $CuInSe_2$ (CIS), CdTe, a semiconductor organic material or a multi-layer structure formed by stacking the aforementioned materials. The aforementioned "silicon" includes single crystal silicon, polycrystal silicon, amorphous silicon, or microcrystal silicon. The n-type dopant doped to the semiconductor material can be selected from a fifth group elements in the periodic table, for example, P, As, or Sb, etc. The p-type dopant doped to the semiconductor material can be selected from a third group elements in the periodic table, for example, B, Al, Ga, In, etc., which is not limited by the invention. Namely, when the signal light L2 irradiates the first type doped semiconductor layer 134 and the second type doped semiconductor layer 136, the light detecting semiconductor unit 130 of the present embodiment generates a light current to produce the electric signal S1 according to the energy provided by the signal light L2, so that the produced electric signal S1 is, for example, varied according to the intensity of the signal light L2.

In detail, in the present embodiment, the light detecting semiconductor array 120 further includes a plurality of first electrodes 151 and a second electrode 152. Each of the first electrodes 151 is electrically connected to the first type doped semiconductor layer 134 of one of the light detecting semiconductor units 130, the second electrode 152 is electrically connected to the second type doped semiconductor layers 136, where the first electrodes 151 are configured to transmit the electric signals S1. To be specific, the second electrode 152 is, for example, a ground electrode, and the first electrodes 151 and the second electrode 152 are used in collaboration to assist movement of electrons and holes excited from the first type doped semiconductor layer 134 and the second type doped semiconductor layer 136, and transmit the light current formed by the electrons and the holes.

Referring to FIG. 1, in the present embodiment, the photon-drive fingerprint identification module 100 further includes a substrate 140. The light emitting unit 110 and the light detecting semiconductor array 120 are disposed on a surface 141 of the substrate 140, and the light detecting semiconductor array 120 is located between the finger 50 and the substrate 140. Namely, the light emitting unit 110 and the light detecting semiconductor array 120 are located on a same plane, and a thickness D1 of the light detecting semiconductor units 130 in the light detecting semiconductor array 120 that is perpendicular to the surface 141 is, for example, smaller than 5000 µm. In an embodiment of the invention, the thickness of the light detecting semiconductor unit is, for example, smaller than 200 µm.

On the other hand, a shortest distance d2 between the light emitting unit 110 and the light detecting semiconductor units 130 is smaller than or equal to 20 mm. Therefore, the finger 50 above the light detecting semiconductor array 120 can be fully irradiated by the light emitted by the light emitting unit 110, such that the signal light L2 reflected by the finger 50 and the fingerprint 52 may carry a more complete signal, and the whole volume of the photon-drive fingerprint identification module 100 can be decreased.

Figure 2:
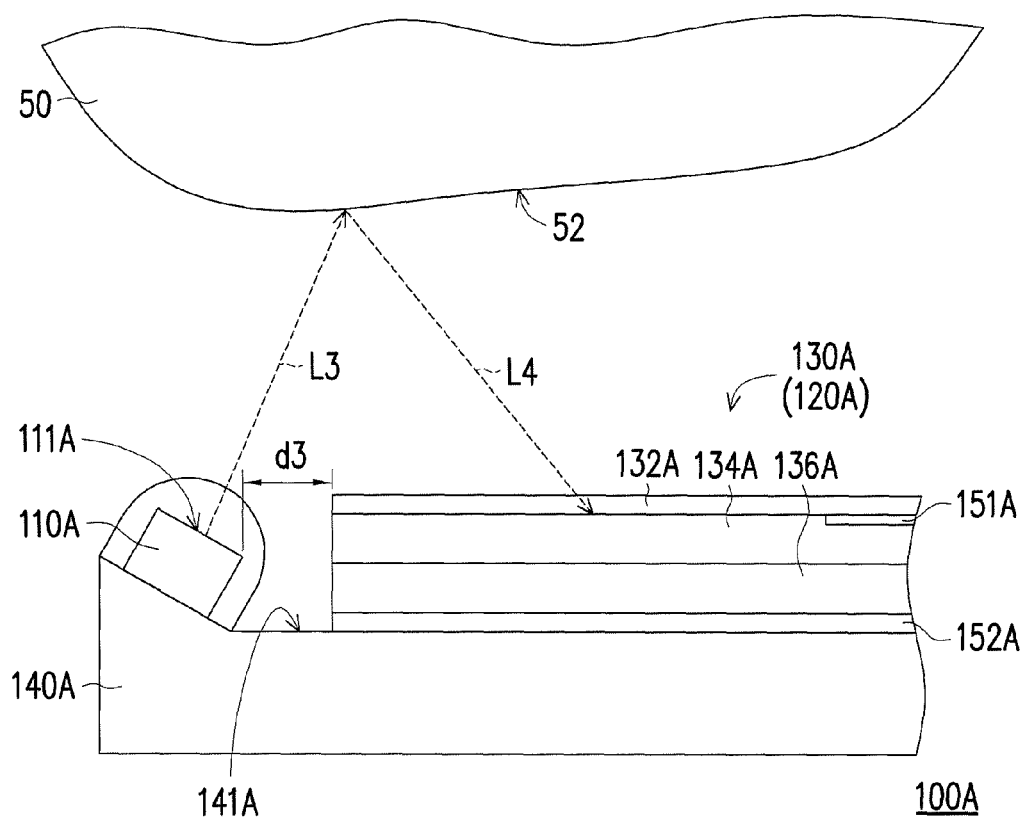
FIG. 2 is a partial cross-sectional view of a photon-drive fingerprint identification module according to a second embodiment of the invention.

In the present embodiment, the light emitting unit 110 has a light emitting surface 110, where the light emitting surface 110 is parallel to the surface 141. Namely, the light emitting unit 110 emits the detecting light L1 along a direction perpendicular to the surface 141. In detail, a light transmitting package 112 can be formed outside the light emitting unit 110 of the present embodiment, and the detecting light L1 is refracted by the light transmitting package 112 to form a good light source, though the invention is not limited thereto. FIG. 2 is a partial cross-sectional view of a photon-drive fingerprint identification module according to a second embodiment of the invention. Referring to FIG. 2, in the second embodiment of the invention, the light emitting surface 111A of the light emitting unit 110A can also be tilted relative to the surface 141A, where an angle between the light emitting surface 111A and the surface 141A is determined according to a size of the light detecting semiconductor array 120, by which a detecting light L3 is more easy to be transmitted to the finger 50 and is reflected by the same to form a signal light L4. Therefore, the photon-drive fingerprint identification module 100A may provide a good fingerprint identification function. On the other hand, since a shortest distance d3 between the light emitting unit 110A and the light detecting semiconductor units 130A is smaller than or equal to 20 mm, not only can the light emitting unit 110A serve as a good light source, but also the whole volume of the photon-drive fingerprint identification module 100A can be decreased.

On the other hand, referring to FIG. 1, in the first embodiment of the invention, the antireflection structure 132 of the light detecting semiconductor unit 130 is, for example, a plurality of optical microstructures. Further, in the first embodiment of the invention, the antireflection structure 132 of the light detecting semiconductor unit 130 is, for example, a plurality of optical microstructures formed by roughening the surface of the first type doped semiconductor layer 134, though the invention is not limited thereto.

Referring to FIG. 2, in the second embodiment of the invention, the antireflection structure 132A of the light detecting semiconductor unit 130A is, for example, an antireflection layer. In detail, the light detecting semiconductor unit 130 of the present embodiment is, for example, formed by sequentially stacking the second electrode 152A, the second type doped semiconductor layer 136A, the first type doped semiconductor layer 134A, the first electrodes 151A and the antireflection layer 132A on the surface 141A of the substrate 140A, where the antireflection layer 132A is, for example, a multi-layer antireflection coating, though the invention is not limited thereto. On the other hand, the antireflection layer 132A of the present embodiment is, for example, a plurality of antireflection layers 132A respectively disposed on the light detecting semiconductor units 130A, though the invention is not limited thereto. In other embodiments of the invention, the antireflection layer can also be an antireflection layer covering the whole light detecting semiconductor array 120A, though the invention is not limited thereto. In the present embodiment of the invention, configuration of the first electrodes and the antireflection layer is not limited to the configuration of the first electrodes 151A and the antireflection layer 123A, and in other embodiments of the invention, the antireflection layer can be disposed between the first type doped semiconductor layer and the first electrodes.

In the aforementioned embodiments of the invention, the light detecting semiconductor units 130, 130A are, for example, adapted to detect a target light, where a wavelength of the target light is within a specific waveband, and the specific waveband includes wavelengths of the detecting lights L1 and L3. Further, in an embodiment of the invention, the wavelength of the specific waveband is greater than or equal to 300 nm and is smaller than or equal to 3 µm. Namely, the light detecting semiconductor units 130, 130A are mainly configured for detecting a light with a wavelength within the specific waveband, so that the light detecting semiconductor units 130, 130A can detect the signal lights L2 and L4, so as to provide a good fingerprint identification effect. The light emitting units 110, 110A are, for example, light emitting diodes (LEDs), laser diodes (LDs) or organic light emitting diodes (OLEDs), though the invention is not limited thereto. In other embodiments of the invention, the light emitting unit may adopt a proper light source according to a main waveband detected by the light detecting semiconductor units. On the other hand, in the present embodiment, the light emitted by the light emitting unit is, for example, a visible light, an invisible light or a light with a single wavelength, though the invention is not limited thereto. In an exemplary embodiment of the invention, the light detecting semiconductor unit is configured for receiving an electromagnetic signal with a wavelength ranging from 300 nm to 3 µm.

Figure 3:
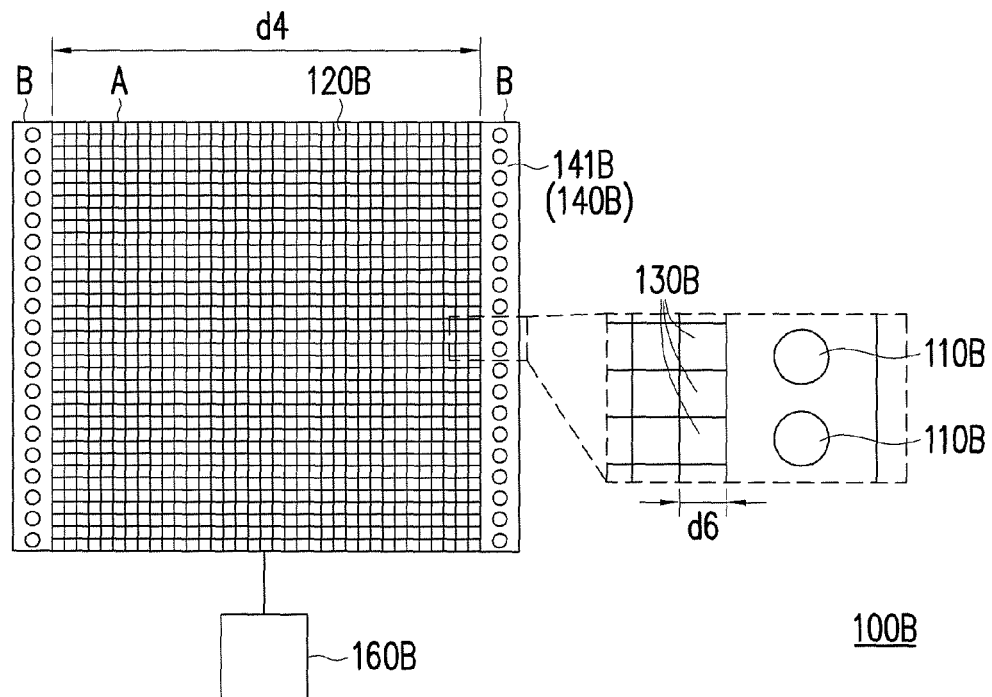
FIG. 3 is a top view and partial enlarged view of a photon-drive fingerprint identification module according to a third embodiment of the invention.

FIG. 3 is a top view and partial enlarged view of a photon-drive fingerprint identification module according to a third embodiment of the invention. Referring to FIG. 3, in the third embodiment of the invention, the surface 141B of the substrate 140B includes a detecting region A and two light emitting regions B, where the light emitting regions B are located at a peripheral region of the detecting region A. The light detecting semiconductor units 130B are arranged in the detecting region A, i.e. the light detecting semiconductor array 120B is disposed in the detecting region A, and the light emitting units 110B are disposed in the light emitting regions B. In detail, in the present embodiment, the light emitting regions B are located at two sides of the detecting region A, and the light emitting units 110B are configured at the two sides of the detecting region A. Therefore, when the finger 50 presses the detecting region A, the finger 50 can be more evenly irradiated by the lights emitted by the light emitting units 100B, such that the photon-drive fingerprint identification module 100B may provide a good fingerprint identification effect.

Figure 4:
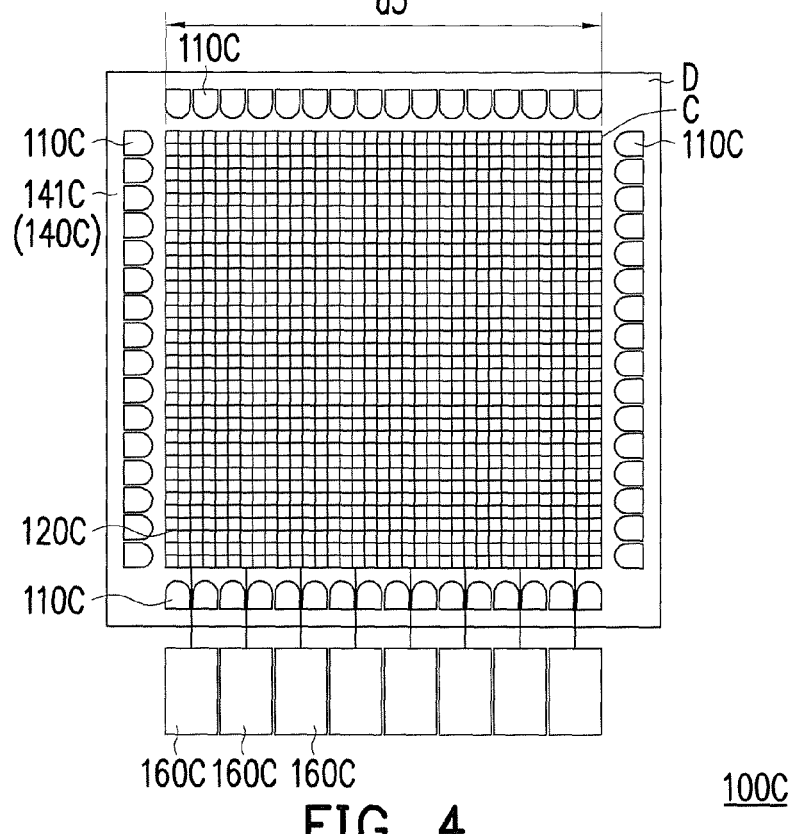
FIG. 4 is a top view of a photon-drive fingerprint identification module according to a fourth embodiment of the invention.

FIG. 4 is a top view of a photon-drive fingerprint identification module according to a fourth embodiment of the invention. The embodiment of the invention is not limited to the above configuration of the detecting region A and the light emitting regions B. In the fourth embodiment of the invention, the light emitting regions D on the surface 141C of the substrate 140C may further encircle the detecting region C, and the light emitting units 110C encircle the detecting region C, such that when a finger approaches to the detecting region C, the finger can be evenly irradiated by the lights emitted by the light emitting units 110C. Therefore, the photon-drive fingerprint identification module 100C may provide a good fingerprint identification effect. On the other hand, the light emitting surfaces of the light emitting units 110, 110A are not limited to be parallel or tilted relative to the surface of the substrate, and in the fourth embodiment of the invention, the light emitting surface of the light emitting unit 110C can be perpendicular to the surface 141C of the substrate 140C, i.e. to irradiate the light above the light detecting semiconductor array 120 in a parallel manner, though the invention is not limited thereto.

In detail, the aforementioned detecting region A and the detecting region C may have a rectangular profile. Referring to FIG. 3 and FIG. 4, in the present embodiment, the detecting region A and the detecting region C, for example, have a square profile, and a side length d4 of the detecting region A and a side length d5 of the detecting region C are greater than or equal to 4 mm, and a surface of each of the light detecting semiconductor units 130B parallel to the surface 141C, for example, has a rectangular profile, and each side length d6 (referring to FIG. 3) thereof is, for example, greater than or equal to 10 µm and is smaller than or equal to 50 µm, such that in collaboration with the design of the light emitting regions B or the light emitting regions D, a good fingerprint identification effect is achieved, though the invention is not limited thereto. In an embodiment of the invention, the detecting region may have a rectangular profile. In an embodiment of the invention, each side length of the detecting region with the rectangular profile is greater than or equal to 4 mm and is smaller than or equal to 50 centimeter (cm).

Referring to FIG. 3, in the second embodiment of the invention, the photon-drive fingerprint identification module 100B further includes a processing unit 160B. The processing unit 160B is electrically connected to the light detecting semiconductor units 130B, and converts the electric signals generated by the light detecting semiconductor units 130B into at least one digital signal, though the invention is not limited thereto. Referring to FIG. 4, the photon-drive fingerprint identification module 100C may further include a plurality of processing units 160C, which are adapted to perform signal processing in groups for the light detecting semiconductor units of the light detecting semiconductor array 120C, or perform signal processing for each of the light detecting semiconductor units, which is not limited by the invention. In the embodiment of the invention, the processing unit, for example, includes an analog-to-digital converter (ADC), and the ADC is used to produce at least one digital signal, and since the digital signal includes information of the fingerprint, a post end signal processing of the fingerprint identification is more convenient.

In summary, in the photon-drive fingerprint identification module of the invention, the light emitting units are configured to emit the detecting lights to irradiate the finger, and the light detecting semiconductor units in the light detecting semiconductor array are configured to receive the signal light formed by the detecting lights after being reflected by the finger, so as to output the electric signals corresponding to the fingerprint. Since the thickness of the photon-drive fingerprint identification module is determined by the thickness of the light detecting semiconductor units, a whole volume of the photon-drive fingerprint identification module can be decreased by thinning the light detecting semiconductor units of the light detecting semiconductor array. Meanwhile, since each of the light detecting semiconductor units includes the antireflection layer to assist receiving the signal light, i.e. the light input amount of the light detecting semiconductor units is enhanced through the antireflection layer, and a receiving efficiency of the light detecting semiconductor array for the signal light is enhanced, the photon-drive fingerprint identification module of the invention can provide a fingerprint identification effect with high sensitivity.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A photon-drive fingerprint identification module, configured to detect a fingerprint of a finger, the photon-drive fingerprint identification module comprising:
   at least a light emitting unit, configured to emit a detecting light to the finger, wherein the finger and the fingerprint reflect the detecting light and turn the detecting light into a signal light; and
   a light detecting semiconductor array, comprising a plurality of light detecting semiconductor units arranged in an array, wherein the light detecting semiconductor units are configured to receive the signal light reflected by the finger and generate a plurality of electric signals, each of the light detecting semiconductor units sequentially comprises an antireflection structure, a first type doped semiconductor layer and a second type doped semiconductor layer from a side close to the finger, wherein the first type doped semiconductor layer is stacked between the antireflection structure and the second type doped semiconductor layer, and the antireflection structure is disposed at a surface of the first type doped semiconductor layer.

2. The photon-drive fingerprint identification module as claimed in claim 1, further comprising a substrate, wherein the at least one light emitting unit and the light detecting semiconductor array are disposed on a surface of the substrate, and the light detecting semiconductor array is located between the finger and the substrate.

3. The photon-drive fingerprint identification module as claimed in claim 2, wherein the surface of the substrate comprises a detecting region and at least one light emitting region, the at least one light emitting region is located beside the detecting region, the light detecting semiconductor units are arranged in the detecting region, and the light emitting unit is disposed in the light emitting region.

4. The photon-drive fingerprint identification module as claimed in claim 3, wherein the at least one light emitting region is plurality of light emitting regions, the at least one light emitting unit is a plurality of light emitting units, and the light emitting region is located at a peripheral region of the detecting region.

5. The photon-drive fingerprint identification module as claimed in claim 3, wherein the detecting region has a rectangular profile, and each side length of the detecting region is greater than or equal to 4 millimeter (mm).

6. The photon-drive fingerprint identification module as claimed in claim 2, wherein the at least one light emitting unit has a light emitting surface, and the light emitting surface is parallel to the surface of the substrate.

7. The photon-drive fingerprint identification module as claimed in claim 2, wherein the at least one light emitting unit has a light emitting surface, and the light emitting surface is oblique to the surface of the substrate.

8. The photon-drive fingerprint identification module as claimed in claim 1, wherein the antireflection structures are an antireflection layer.

9. The photon-drive fingerprint identification module as claimed in claim 1, wherein the antireflection structure of each of the light detecting semiconductor units is a plurality of optical microstructures.

10. The photon-drive fingerprint identification module as claimed in claim 1, wherein a shortest distance between the light emitting unit and the light detecting semiconductor units is smaller than or equal to 20 mm.

11. The photon-drive fingerprint identification module as claimed in claim 1, wherein the light detecting semiconductor array further comprises a plurality of first electrodes and a second electrode, each of the first electrodes is electrically connected to the first type doped semiconductor layer of one of the light detecting semiconductor units, the second electrode is electrically connected to the second type doped semiconductor layers, and the first electrodes are configured to transmit the electric signals.

12. The photon-drive fingerprint identification module as claimed in claim 1, wherein the light detecting semiconductor units are configured to detect a target light, wherein a wavelength of the target light is within a specific waveband, and the specific waveband comprises a wavelength of the detecting light.

13. The photon-drive fingerprint identification module as claimed in claim 12, wherein the wavelength of the specific waveband is greater than or equal to 300 nanometer (nm) and is smaller than or equal to 3 micrometer (μm).

14. The photon-drive fingerprint identification module as claimed in claim 1, further comprising at least one processing unit, wherein the at least one processing unit is electrically connected to the light detecting semiconductor units, and converts the electric signals into at least one digital signal.

* * * * *